United States Patent
Scurlock, Jr. et al.

(10) Patent No.: US 8,266,678 B2
(45) Date of Patent: Sep. 11, 2012

(54) DERIVING A USERNAME BASED ON A DIGITAL CERTIFICATE

(75) Inventors: James E. Scurlock, Jr., Helena, AL (US); Rex Blackwell, Birmingham, AL (US); Bruce B. Burson, Jr., Hoover, AL (US); Neal F. Johnson, Birmingham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 814 days.

(21) Appl. No.: 11/772,384

(22) Filed: Jul. 2, 2007

(65) Prior Publication Data
US 2009/0013384 A1    Jan. 8, 2009

(51) Int. Cl.
G06F 7/04 (2006.01)
(52) U.S. Cl. .............................. 726/4; 726/10
(58) Field of Classification Search .............. 726/4, 10
See application file for complete search history.

(56) References Cited

U.S. PATENT DOCUMENTS

| | | | |
|---|---|---|---|
| 7,047,406 B2 * | 5/2006 | Schleicher et al. | 713/168 |
| 2002/0184501 A1 * | 12/2002 | Bin Abdul Rahman et al. | 713/173 |
| 2006/0015716 A1 * | 1/2006 | Thornton et al. | 713/155 |
| 2008/0016357 A1 * | 1/2008 | Suarez | 713/176 |

OTHER PUBLICATIONS

SupportPac MSOR WebSphere MQ channel security Exit; User Guide Version 1.24; ftp://ftp.software.ibm.com/software/integration/support/supportpacs/individual/ms0r.pdf; Jorgen H. Pedersen; May 2007; pp. 1-62.

Author Morag Hughson, entitled "How Secure are your Channels?"; ftp://ftp.software.ibm.com/software/integration/pdf/SSLIntro.pdf; Jan. 2004, pp. 1-8.

* cited by examiner

*Primary Examiner* — Kim Vu
*Assistant Examiner* — Suman Debnath
(74) *Attorney, Agent, or Firm* — Thomas, Kayden, Horstemeyer & Risley, LLP (57) ABSTRACT

One embodiment of a method for determining a username comprises obtaining a digital certificate from a first computer application requesting a service; authenticating the digital certificate of the first computer application; and retrieving the username from the digital certificate that is recognized by a second computer application performing the service as a user of the second computer application. Other methods and systems are also provided.

16 Claims, 6 Drawing Sheets

DERIVING A USERNAME BASED ON A DIGITAL CERTIFICATE

CROSS-REFERENCE TO RELATED APPLICATION

Not applicable.

COPYRIGHT NOTICE

Not applicable.

STATEMENT REGARDING FEDERALLY SPONSORED RESEARCH OR DEVELOPMENT

Not applicable.

TECHNICAL FIELD

The present disclosure is generally related to computer networks and, more particularly, is related to computer network verification techniques.

BACKGROUND

Computer devices often communicate with each other across a computer network, where a computer device may communicate with more than one computer device at a time.

Often a computer application associates different users by different usernames. Access rights within the computer application may be assigned to a user based on the user's username. Further, a user is often authenticated to the computer application based upon a digital certificate. However, an authenticated user could possibly utilize someone else's username and purport to be another user of the computer application. Therefore, this "someone else" may have the access rights and permissions of another user by presenting himself or herself as the other user. Thus, there is no guarantee that this "someone else" is the person that he or she is purporting to be.

SUMMARY

Embodiments of the present disclosure provide systems and methods for determining a username. One such method, among others, comprises obtaining a digital certificate from a first computer application requesting a service; authenticating the digital certificate of the first computer application; and retrieving the username from the digital certificate that is recognized by a second computer application performing the service as a user of the second computer application.

Other methods, systems, computer products, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure now will be described more fully hereinafter with reference to the accompanying drawings, in which exemplary embodiments are shown. Embodiments should not be construed as being limited to the examples described herein; rather, these examples are provided so that this disclosure will be thorough and complete, and will fully convey the scope of the present disclosure to those of ordinary skill in the art. Moreover, all statements herein reciting embodiments of the present disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the flowcharts, block diagrams, and the like represent conceptual views or processes illustrating systems and methods embodying the present disclosure. The functions of the various elements shown in the figures may be provided through the use of dedicated hardware as well as hardware capable of executing associated software.

Figure 1:
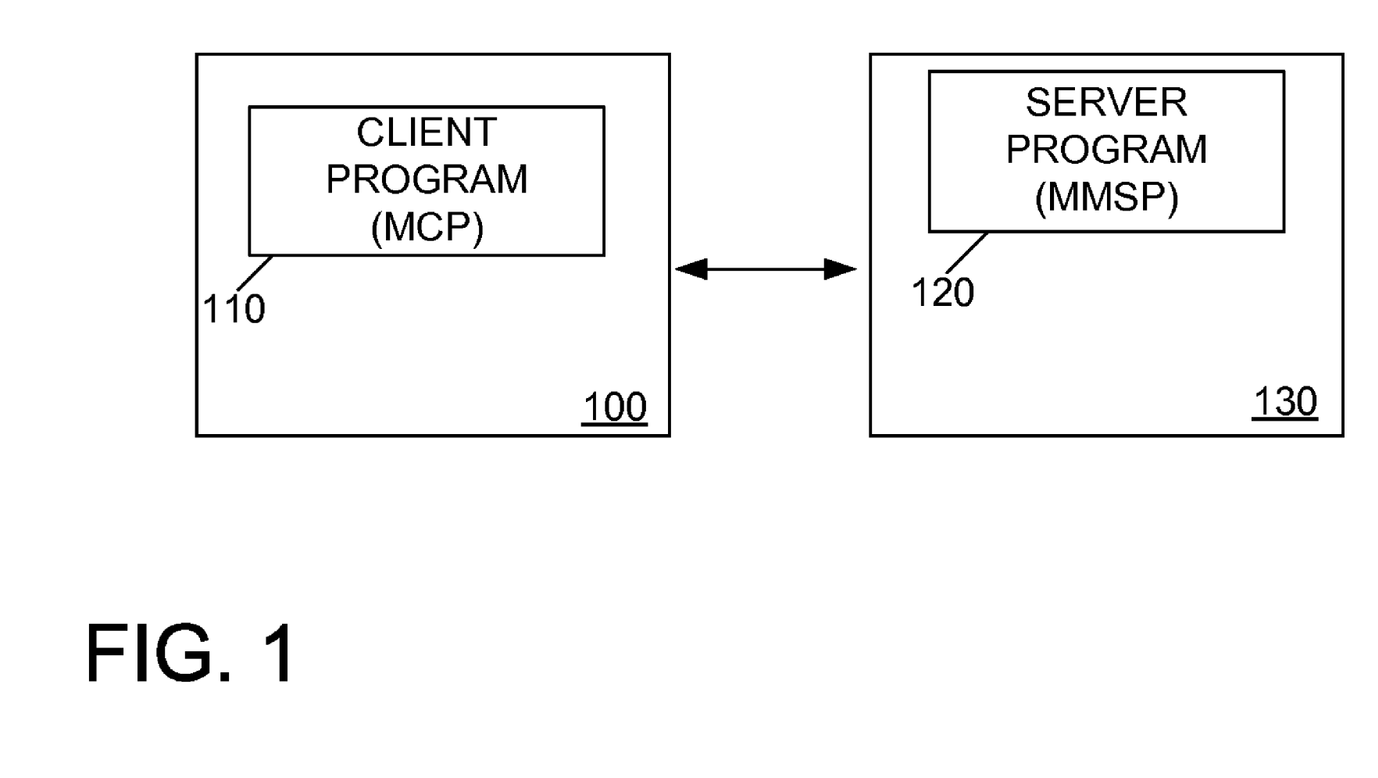
FIG. 1 is a block diagram of a system for determining a username in accordance with an embodiment of the present disclosure.

Referring now to the figures, FIG. 1 is a block diagram showing a client program 110 residing in a computer system 100. The client program 110 communicates with a server program 120 in a computer system 130. For discussion purposes and not meant to be limiting, the client program 110 is a messaging client program (MCP) 110, which communicates with a messaging middleware server program (MMSP) 120. In one embodiment, the messaging middleware server program is a WEBSPHERE MQ application. Note also, that two computing systems 100, 130 may both have client programs in communications with each other in accordance with the present disclosure or two server programs in communications with each other in accordance with the present disclosure.

It is noted that moving data between different computer systems can be difficult to do in an organized and secure manner. For example, data may have to be moved across different software systems, hardware platforms, networks, and devices. Also, sending and receiving applications are not always available to complete data transfers. Therefore, a MMSP 120 may be used to aid in transferring data between MCP 110 and another computer system.

In one embodiment, the messaging middleware server program 120 includes a message queue system for receiving and storing messages from messaging applications, such as the messaging client program 110. The messaging middleware server program 120 can also route received messages to other computing devices. In receiving and sending messages, the messaging middleware server program 120 creates a communication channel (such as a secured sockets layer (SSL) channel) between the messaging middleware server program 120 and a client computing device, such as computer system 100. The client connection is associated with the client device 100 and has pre-configured authority based on the client device identity.

Communications over the communication channel is generally desired to be secure. Therefore, computing devices or users involved in communications over the channel may have to authenticate themselves before communications can proceed. Authentication may be performed using authentication challenges, such as requests for username and passwords. Also, a user may present a digital certificate by a trusted certificate authority that vouches for the identity of the user. In accordance with an embodiment of the present disclosure, a digital certificate of a user also contains the username of the user that is recognized by the messaging middleware server program 120. Therefore, a connection may be created based upon a user's username, and a person may be authenticated to be the user based upon the username contained in the person's digital certificate. This allows for a particular username recognized by the messaging middleware server program 120 to be automatically associated with a user's certificate. Otherwise, a user may authenticate himself or herself to a server 130 and prove that he is "Bob Thomas," but the server 130 does not know who the user is in terms of the usernames. For example, the server 130 may have usernames of bobt1122, bobt2233, and bobt3344, and the server 130 would not know from authentication of the certificate, which username, if any, is that of "Bob Thomas."

It is noted, in general, that use of a digital certificate does not necessarily authenticate a client's identity with an application such as MMSP 120. For example, a SSL handshake only authenticates the certificate and does not determine a user identifier (username or userID) to be associated with a client session. It is possible to pre-configure a client connection with a particular userID or name, but someone with a valid digital certificate could then assume the identity of the pre-configured userID or name. Embodiments of the present disclosure, however, advantageously determine a username based upon the client's digital certificate. With this approach, client connections need not be pre-configured with userID, but may be used by anyone with a valid digital certificate.

Accordingly, one embodiment of the present disclosure includes a convention for digital certificates that specifies that a common name of the digital certificate must have a particular syntax where the first node (or another node in a different implementation) of the common name (or another certificate component in a different implementation) is a user's username for the messaging middleware server program 120. In receipt of a certificate, the messaging middleware server program 120 parses the common name and associates the first node of the common name as the user's username. Therefore, the user that is authenticated using the digital certificate is automatically associated as having the username contained in the digital certificate.

The messaging client program 110 and messaging middleware server program 120 operate within a system memory device of a computer system 100, 130. The messaging middleware server program 120, for example, is shown residing in a memory subsystem 212 in FIG. 2. The messaging middleware server program 120 or messaging client program 110, however, could also reside in flash memory or peripheral storage device of a respective computer system 100, 130. The messaging middleware server program 120 or messaging client program 110 may be downloaded from a network server or provided on a storage media (e.g., diskette, CD-ROM, or installed by the computer system manufacturer) to a subscribing customer or user to install on the computer system 100, 130 to provide messaging services.

Figure 2:
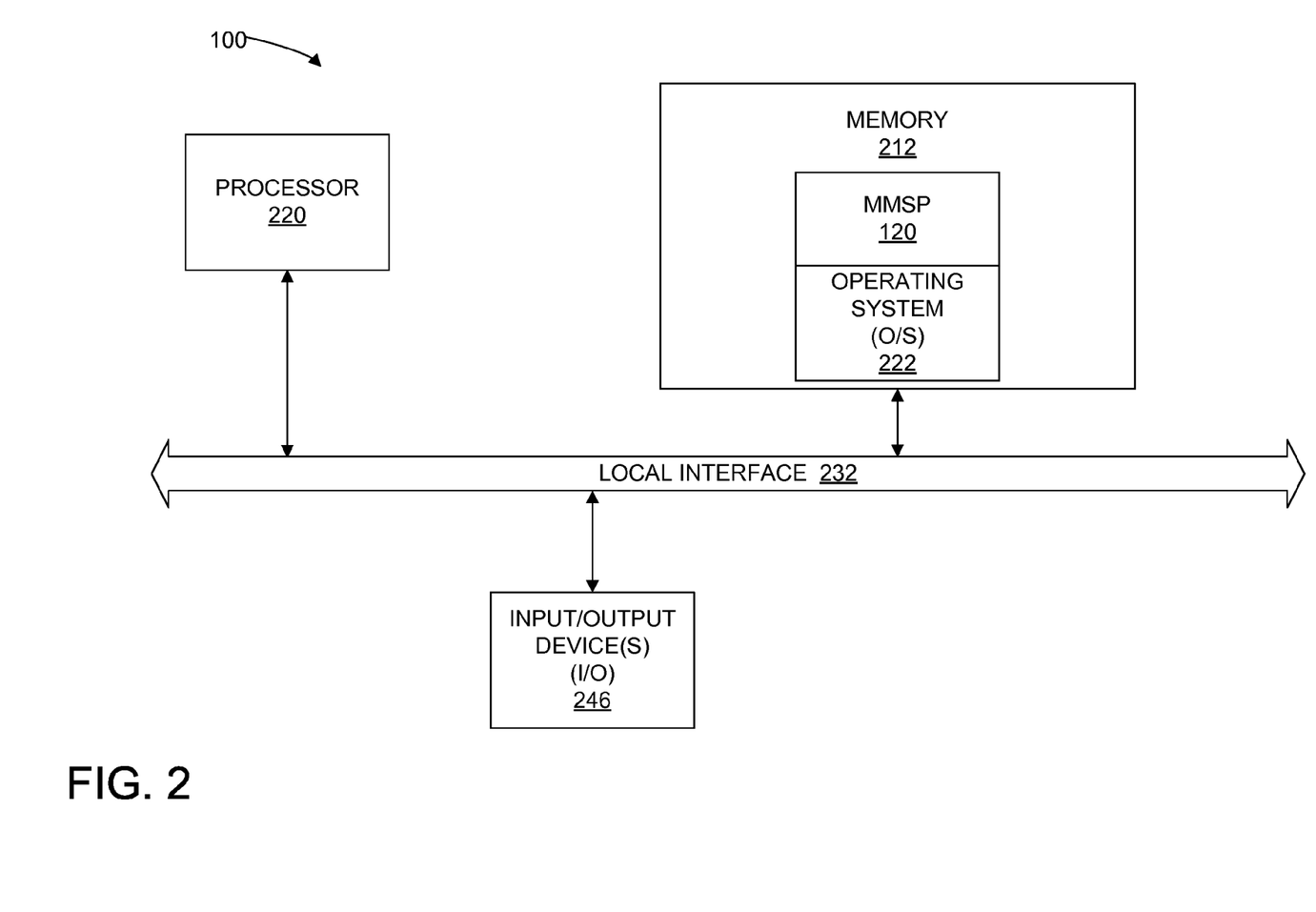
FIG. 2 is a block diagram of a computer system utilized in the system diagram of FIG. 1.

The computer system 100, 130 also has one or more central processors 220 executing an operating system 222. The operating system 222, as is well known, has a set of instructions that control the internal functions of the computer system 100. A system bus or local interface 232 communicates signals, such as data signals, control signals, and address signals, between the central processor 220 and computer system components. The computer system includes one ore more input and/or output (I/O) devices 246 (or peripherals) that are communicatively coupled via the local interface 232.

A messaging middleware program 120 or messaging client program 110 operates within a respective computer system 100, 130. The messaging middleware server program 120 may communicate with the messaging client program 110. The messaging middleware server program 120 allows for storage and transfer of messages received from the messaging client program 110. The messaging middleware server program 120 may include queues, which are objects that store messages in the application or program 120. The messaging middleware server program 120 may further include a Queue Manager component, which handles storage and functions not directly related to movement of messages.

Figure 3:
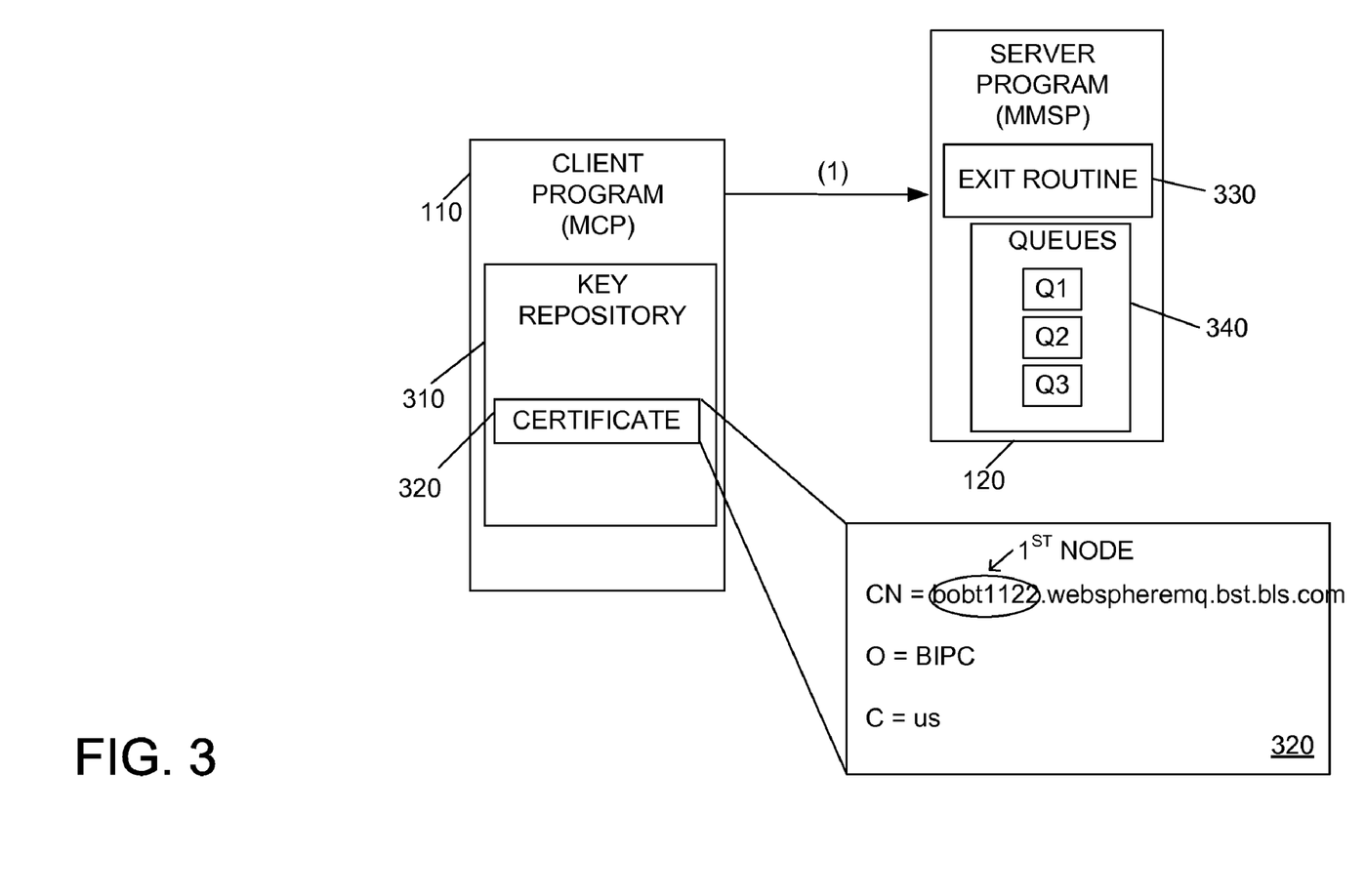
FIG. 3 is a block diagram of components of the system of FIG. 1.

FIG. 3 is a block diagram showing the messaging client program 110 and messaging middleware server program 120 transferring a message according to an embodiment of the present disclosure. The messaging client program 110 could be on a desktop or a server system, such as another messaging middleware server program 120. The messaging client program 110 has a key repository 310 holding certificates for users of the program. In this key repository, there is a certificate 320 which has been signed by a certificate authority for a user, Bob Thomas, as an illustrative example. The certificate generally contains fields or attributes of information such as Common Name (CN), Organization (O), Country (C), etc. In the present example, the common name (CN) is bobt1122.websheremq.bst.bls.com. This is the common name associated with the certificate 320.

The messaging client program 110 with that digital certificate in its database or repository 310 makes a connection attempt on a client channel (1) to the messaging middleware server program 120. A copy of the certificate 320 is also passed from the messaging client program 110 to the messaging middleware server program 120. At the messaging middleware server program 120, an exit routine gets called to authenticate the received certificate 320. After the exit routine 330 authenticates the certificate, the exit routine 330 detects the common name on the certificate 320. In this example, the exit routine 330 parses out "bobt1122" which is located at the first node of the common name and assigns "bobt1122" as the username of the user or application participating in the communication session with the messaging middleware server program 120. Accordingly, based on the username, access rights and privileges associated with the username are used in the communication session. By having the username contained in the certificate 320 itself, the certificate 320 is self identifying and is not dependent upon separate labels or tables that are used to identify a username associated with a certificate 320 by the computer application. Further, a username does not have to be preconfigured and associated with a connection (2) beforehand. The exit routine 330 sets a username depending on the contents of a received certificate 320.

One-way or two-way verification of usernames by communicating applications may be established using the above-described approach. For example, in a two-way verification process, each exit program of an application could request a certificate from the other application and identify a username for a user providing a certificate with the username contained in the user's certificate.

After a connection (such as SSL channel) is established and a user authenticated and associated with a username, the user is allowed to perform activities that have been allowed or configured for the username. For example, the user may be allowed to access some queues 340, such as Q1 and Q2, but not others, like Q3. In other words, the user authenticates himself or herself at the outset of requesting a connection and the messaging middleware server program 120 knows who the user is and what permissions the user has based on the user's certificate 310. The messaging middleware server program 120 dynamically creates a channel connection based on the username of the certificate 310. By each certificate following a same structure or template, a username can be located within a certificate 310 for a user. Accordingly, rather than preconfiguring connections for each user, one channel template is designed and use to create a channel as needed based upon locating a username within a user's certificate. Therefore, identity for a client connection may be set based on the contents of the digital certificate 310, and the client connection has pre-configured authority for accessing objects, such as messaging queues 340.

Figure 4:
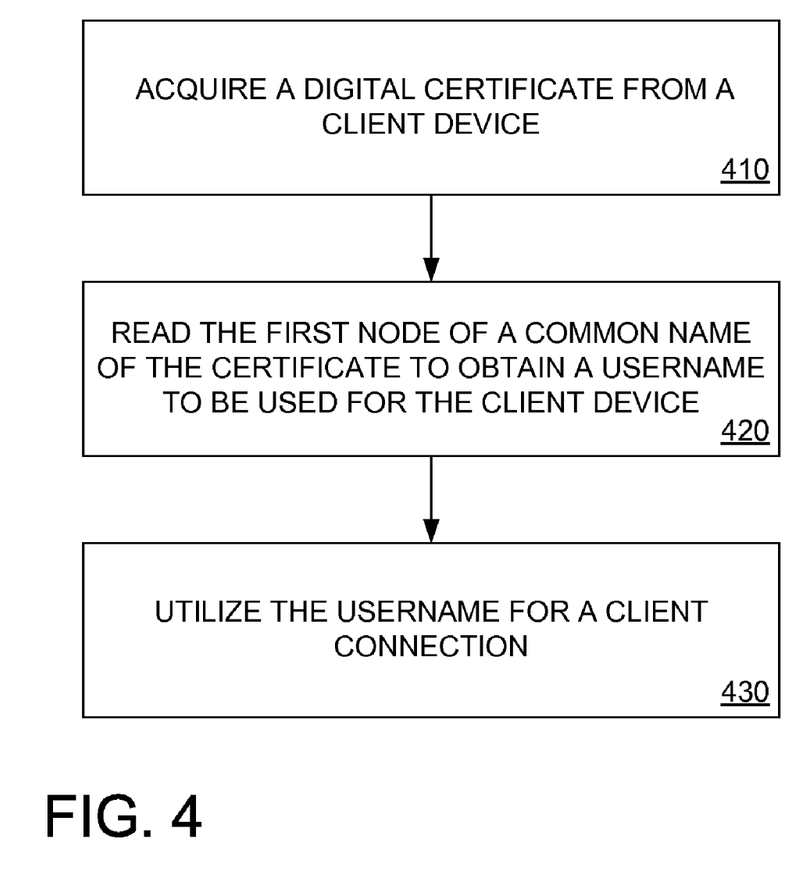
FIGS. 4-6 are flow chart diagrams of embodiments, among others, of processes utilized to determine a username in accordance with the present disclosure.

Referring now to FIG. 4, a flow chart describing one embodiment of a method for deriving a username for a client connection is shown. In this method, a digital certificate 310 is acquired (410) from a client device (e.g., computer system 100) by a server device (e.g., computing system 130). The digital certificate 310 has a specially formatted common name, where the first node of the common name (or other pre-defined location) is the username for the client device. In this way, the username is embedded in a digital certificate, such that the certificate uniquely identifies an owner of the certificate and the username in a way that the server device can recognize it.

On the server device 130, an exit program 330 reads (420) the common name of the certificate and parses the first node of the common name. The exit program 330 requests the server device 130 to utilize the first node as the username for the client connection. This ensures that a particular certificate has a single, unique username associated with it and embedded in it. Further, the server device utilizes (430) that username for the client connection.

The exit program 330 provides either one-way or two-way (mutual) verification of a partner system when a communication session is being established. For a particular channel, each exit program has an associated username. A connection between two exit programs is an association between the two usernames.

As an example, if a server program 120 has N client programs 110 that it services, and therefore N different unique client IDs or usernames involved, the server program 120 could know these in advance and predefine or hardcode channels for each of the client programs 110. Alternatively, in accordance with the present disclosure, a channel template may be used to create connections such that a connection can be created dynamically since the username used in configuring a connection may be obtained from a digital certificate or credential used to authenticate a user requesting the connection.

Figure 5:
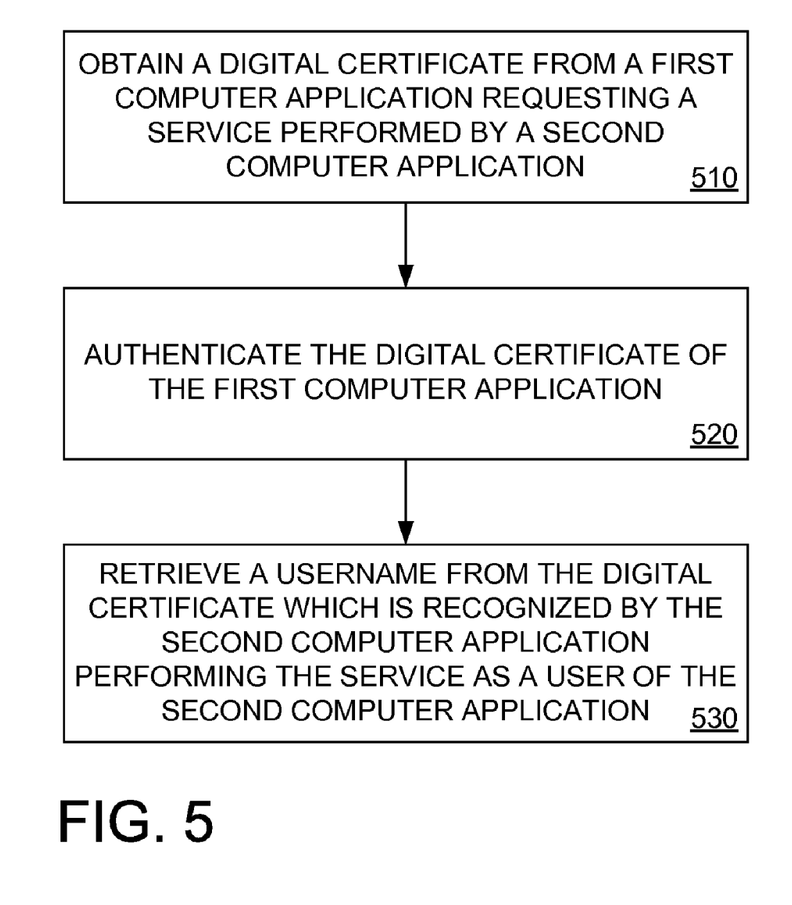

Referring now to FIG. 5, a flow chart describing one embodiment of a method for determining a username is shown. In the method, a digital certificate of a first computer application (e.g., MCP 110) requesting a service is obtained (510) from the first computer application (e.g., MCP 110). The digital certificate 320 of the first computer application is authenticated (520) by a second computer application (e.g., MMSP 120) that received the certificate 320. A username from the digital certificate 320 is retrieved (530) and recognized by the second computer application (performing the service) as a user of the second computer application. In some embodiments, the username is stored in the digital certificate 320 as part of a common name component of the digital certificate. Further, in some embodiments, the second computer application dynamically creates a connection between the first computer application and the second computer application in response to receiving the username from the digital certificate 320. The connection may be a secured sockets layer connection.

Figure 6:
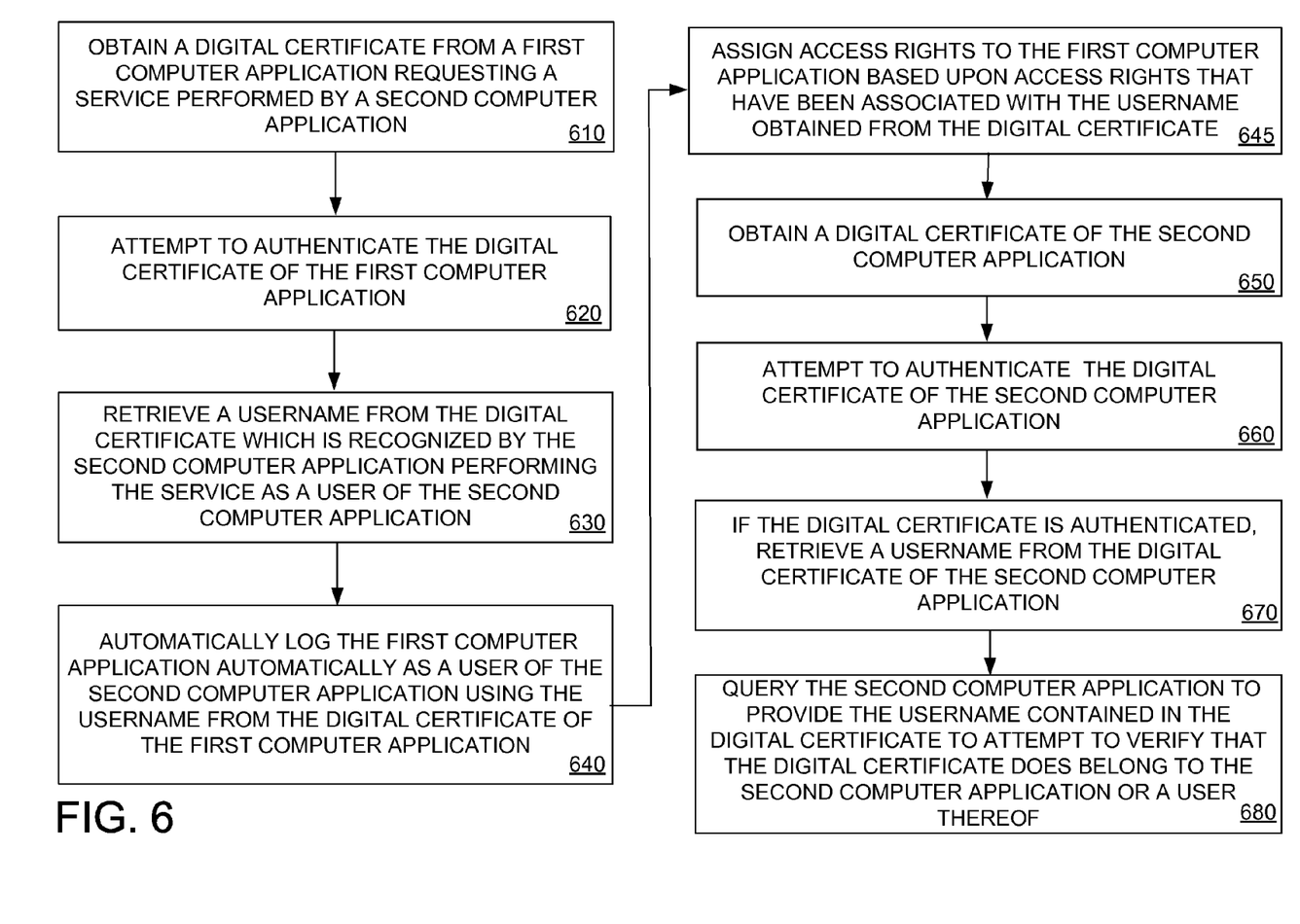

Referring now to FIG. 6, a flow chart describing one embodiment of a method for determining a username is shown. In the method, a digital certificate from a first computer application (e.g., MCP 110) requesting a service is obtained (610) from the first computer application (e.g., MCP 110). The digital certificate 320 of the first computer application is authenticated (620) by a second computer application (e.g., MMSP 120) that received the certificate 320. A username from the digital certificate 320 is retrieved (630) and recognized by the second computer application as a user of the second computer application. Accordingly, the second computer application automatically logs or registers (640) the first computer application as a user of the second computer application using the username from the digital certificate of the first computer application. Further, the second computer application assigns (645) access rights to the first computer application based upon access rights to the second computer application that have been associated with the username obtained from the digital certificate.

Also, a digital certificate 320 of the second computer application is obtained (650) by the first computer application. In this way, the digital certificate 320 or credential of the second computer application may be authenticated (660) by the first computer application or a trusted certificate authority. If the digital certificate is authenticated, then a username is retrieved (670) from the digital certificate of the second computer application. The second computer application may then be queried (680) or challenged to provide the username contained in the digital certificate to attempt to verify that the digital certificate does belong to the second computer application or a user thereof.

Several exemplary implementations of various embodiments of the present disclosure are described herein; however, various modifications and alternate embodiments will occur to those of ordinary skill in the art. For example, the messaging client program 110 and/or messaging middleware server program 120 discussed above may be physically embodied on or in a computer-readable medium, such as a CD-ROM, DVD, tape, cassette, floppy disk, memory card, and large-capacity disk (such as IOMEGA, ZIP, JAZZ, and other large-capacity memory products). This computer-readable medium, or media, could be distributed to end-customers, licensees, and assignees. These types of computer-readable media, and other types not mention here but considered within the scope of this disclosure (such as an Internet file that could be downloaded to the computer system), allow the messaging client program 110 and/or messaging middleware server program 120 to be easily disseminated. Accordingly, the present disclosure is intended to include those other variations, modifications, and alternate embodiments that adhere to the spirit and scope of this disclosure.

Certain embodiments of the present disclosure can be implemented in hardware, software, firmware, or a combination thereof. In some embodiments, system components are stored in a memory and that is executed by a suitable instruction execution system. If implemented in hardware, as in an alternative embodiment, system components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of one or more embodiments of the present disclosure in which functions may be executed out of order from that shown or discussed, including substantially concurrently or in reverse order, depending on the functionality involved, as would be understood by those reasonably skilled in the art of the present disclosure.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the present disclosure. All such modifications and variations are intended to be included herein within the scope of this disclosure.

Therefore, having thus described the invention, at least the following is claimed:

1. A method for determining a first username, comprising:
   obtaining a first digital certificate from a first computer application requesting a service of creating a client channel connection;
   authenticating the first digital certificate of the first computer application;
   after authenticating the first digital certificate, retrieving the first username from the first digital certificate that is recognized by a second computer application performing the service as a registered user of the second computer application, wherein the first digital certificate independently identifies the first username of the registered user;
   automatically logging the registered user into the second computer application as the first username retrieved from the first digital certificate; and
   dynamically creating the channel connection based on the first username between the first computer application and the second computer application in response to the first digital certificate being authenticated and receiving the first username from the first digital certificate,
   wherein the first username is stored in the first digital certificate as part of a common name of the first digital certificate, the common name having a plurality of components separated by a respective delimiter.

2. The method of claim 1, wherein the second computer application comprises a messaging middleware server program.

3. The method of claim 1, further comprising:
   authenticating a second digital certificate of the second computer application; and
   retrieving a second username from the second digital certificate of the second computer application that is recognized by the first computer application as a user of the first computer application.

4. The method of claim 3, further comprising:
   querying the second computer application for the second username contained in the second digital certificate of the second computer application.

5. The method of claim 1, further comprising:
   assigning access rights to the first application based upon the second username obtained from the second digital certificate.

6. The method of claim 1, further comprising:
   querying the first computer application for the first username contained in the first digital certificate.

7. The method of claim 3, further comprising:
   automatically logging in the second computer application as a user of the first computer application as the second username from the second digital certificate of the second computer application.

8. A non-transitory computer readable storage medium encoded with instructions for determining a first username, when executed by a processor, comprises:
   obtaining a first digital certificate from a first computer application requesting a service of creating a client channel connection;
   authenticating the first digital certificate of the first computer application; and
   after authenticating the first digital certificate, retrieving the first username from the first digital certificate that is recognized by a second computer application performing the service as a registered user of the second computer application, wherein the first digital certificate independently identifies the first username of the registered user;
   automatically logging the registered user into the second computer application as the first username retrieved from the first digital certificate; and
   dynamically creating the channel connection based on the first username between the first computer application and the second computer application in response to the first digital certificate being authenticated and receiving the first username from the first digital certificate,
   wherein the first username is stored in the first digital certificate as part of a common name of the first digital certificate, the common name having a plurality of components separated by a respective delimiter.

9. The non-transitory computer readable storage medium of claim 8, wherein the second computer application comprises a messaging middleware server program.

10. The non-transitory computer readable storage medium of claim 8, further comprising:
    authenticating a second digital certificate of the second computer application; and retrieving a second username from the second digital certificate of the second computer application that is recognized by the first computer application as a user of the first computer application.

11. The non-transitory computer readable storage medium of claim 10, further comprising:
querying the second computer application for the second username contained in the second digital certificate of the second computer application.

12. The non-transitory computer readable storage medium of claim 8, further comprising:
assigning access rights to the first application based upon the first username obtained from the first digital certificate.

13. The non-transitory computer readable storage medium of claim 8, further comprising:
querying the first computer application for the first username contained in the first digital certificate.

14. The non-transitory computer readable storage medium of claim 10, further comprising:
automatically logging in the second computer application as a user of the first computer application as the second username from the second digital certificate of the second computer application.

15. A system for determining a username, comprising:
a network interface of a computer system configured to obtain a digital certificate of a user that is requesting a service of creating a client channel connection;
a processor of the computer system configured to attempt to authenticate the digital certificate that is received from the user;
the processor of the computer system further configured to, in response to authenticating the digital certificate, retrieve the username for the user embedded in the digital certificate that is recognized by the computer application as a registered user of the computer application, wherein the digital certificate independently identifies the username of the registered user;
the processor of the computer system further configured to automatically log the user into the computer system under the username obtained from the digital certificate; and
the network interface of the computer system configured to dynamically create the client channel connection between the computer system and a second computer system based on the username in response to the digital certificate being authenticated and the username being obtained from the digital certificate,
wherein the username is stored in the digital certificate as part of a common name of the digital certificate, the common name having a plurality of components separated by a respective delimiter.

16. The system of claim 15, wherein the computer system is further configured to assign, to the user, access rights for the computer system based upon the username retrieved from the digital certificate.

* * * * *